(12) United States Patent
Katsaros et al.

(10) Patent No.: US 11,633,981 B2
(45) Date of Patent: Apr. 25, 2023

(54) WHEEL HUB AND METHOD FOR MANUFACTURING A WHEEL HUB

(71) Applicant: AKTIEBOLAGET SKF, Gothenburg (SE)

(72) Inventors: Padelis Katsaros, Schweinfurt (DE); Volker Wendt, Üchtelhausen/Zell (DE)

(73) Assignee: AKTIEBOLAGET SKF, Gothenburg (SE)

( * ) Notice: Subject to any disclaimer, the term of this patent is extended or adjusted under 35 U.S.C. 154(b) by 414 days.

(21) Appl. No.: 16/892,608

(22) Filed: Jun. 4, 2020

(65) Prior Publication Data

US 2021/0016602 A1    Jan. 21, 2021

(30) Foreign Application Priority Data

Jul. 19, 2019  (DE) .......................... 102019210700.1

(51) Int. Cl.
  *B60B 27/00*   (2006.01)
  *B60B 27/02*   (2006.01)
(52) U.S. Cl.
  CPC .......... *B60B 27/0078* (2013.01); *B60B 27/02* (2013.01); *B60B 2310/302* (2013.01); *B60B 2320/10* (2013.01)
(58) Field of Classification Search
  CPC . B60B 27/0078; B60B 27/0094; B60B 27/02; B60B 27/0047
  See application file for complete search history.

(56) References Cited

U.S. PATENT DOCUMENTS

| 2,349,220 | A | * | 5/1944 | Eksergian | ............... B60B 27/02 301/105.1 |
| 4,795,278 | A | * | 1/1989 | Hayashi | ............. B60B 27/0068 310/155 |
| 6,612,657 | B1 | * | 9/2003 | Fakhoury | ................ B60B 27/02 301/105.1 |
| 2006/0272906 | A1 | * | 12/2006 | Gonska | ................... B60T 8/329 188/218 XL |
| 2011/0182538 | A1 | * | 7/2011 | Langer | ................. F16C 33/805 384/477 |
| 2018/0291953 | A1 | * | 10/2018 | Rode | ....................... F16C 25/06 |

FOREIGN PATENT DOCUMENTS

| DE | 102006023547 A1 | * | 11/2007 | ............. B60B 27/02 |
| WO | WO-2008036033 A1 | * | 3/2008 | ............. B60B 27/00 |
| WO | WO-2009122855 A1 | * | 10/2009 | ......... B60B 27/0005 |

* cited by examiner

*Primary Examiner* — Paul N Dickson
*Assistant Examiner* — Matthew D Lee
(74) *Attorney, Agent, or Firm* — J-Tek Law PLLC; Scott T. Wakeman; Mark A. Ussai

(57) ABSTRACT

A wheel hub includes a one-piece hub base body configured to surround at least a portion of a rolling-element bearing, the base body having a first axial end region configured to attach to a wheel adapter and/or to a wheel and a second axial end region axially opposite the first axial end region. An annular reinforcing body, which may be a metal band, is mounted on a radially outer surface of the second axial end region and connected to the radially outer surface at a joint.

12 Claims, 4 Drawing Sheets

WHEEL HUB AND METHOD FOR MANUFACTURING A WHEEL HUB

CROSS-REFERENCE

This application claims priority to German patent application no. 10 2019 210 700.1 filed on Jul. 19, 2019, the contents of which are fully incorporated herein by reference.

TECHNOLOGICAL FIELD

The disclosure is directed to a one-piece wheel hub reinforced by an annular body.

BACKGROUND

A wheel hub configured one-piece is known that includes two outer-ring raceways for tapered rollers. The wheel hub includes openings for attaching a wheel adapter.

SUMMARY

One aspect of the disclosure is to provide a wheel hub of the above-described type having increased efficiency.

The disclosure is directed to a wheel hub including a first axial end region that is configured for the attachment of a wheel adapter and/or of a wheel, and including at least one hub base body formed one-piece, which hub base body is configured to surround at least a part of a rolling-element bearing.

The disclosed wheel hub includes at least one component surrounding the hub base body, which component is disposed at a second axial end region of the wheel hub, which second axial end region is opposite the first axial end region. "One-piece" is to be understood in particular to mean made of a casting and/or only separable by destruction. According to the disclosure a high efficiency can be achieved. In particular, an increase of the service life of the wheel hub can be achieved, since due to reinforcement by the component, plastic deformations, which occur in particular with tight cornering, can be avoided on an inboard side, i.e., a side that faces the vehicle centerpoint or centerline in the finally mounted state. Furthermore, existing hub base bodies that are already used in wheel hubs can be retrofitted with the component for stabilization, which is particularly economical. In addition, wheel hubs that do not include the component and are configured for a certain axle load range can be used for the next-highest axle load range by the addition of the reinforcing component, which is economical and is therefore very advantageous in particular with small batch sizes in the next-highest axle load range, since a new design of a wheel hub is not required.

Furthermore, the disclosed wheel hub includes at least one hub base body configured one-piece, which hub base body is configured to surround at least a part of a rolling-element bearing, wherein the wheel hub includes at least one component surrounding the hub base body, which component differs from a flange. According to the disclosure a high efficiency can be achieved. In particular, an increase of the service life of the wheel hub can be achieved, since plastic deformations at the inboard side of the wheel hub can be avoided due to reinforcing by the component.

The component preferably comprises at least one antilock braking system (ABS) ring region. Components can thereby be saved and a cost-effective design can be achieved.

The hub base body is advantageously cylindrical-surface-shaped or conical-surface-shaped in a surface region wherein it abuts against the component. A simple manufacturability can thereby be achieved. In particular, a simple attachment of the component by soldering or friction welding can be achieved.

In addition, the component can be attached to the hub base body by a press-fit and/or by brazing and/or by friction welding. In this way a simple assembling can be achieved.

The component preferably has essentially the shape of a circular cylinder. An economical design can thereby be achieved.

The component is advantageously configured essentially annular, whereby material savings can be achieved.

Furthermore, the component can be configured one-piece. A constructively simple design with high stability can thereby be achieved.

Furthermore, a method for manufacturing a wheel hub is provided wherein on a hub base body, formed one-piece, of the wheel hub, which hub base body is configured to surround at least a part of the rolling-element bearing, a component is attached such that it surrounds the hub base body and such that it is disposed at a second axial end region of the wheel hub, which second axial end region opposes a first axial end region that is configured for attaching a wheel adapter and/or a wheel. According to the disclosure a high efficiency can be achieved.

The attaching is preferably effected by shrinking-on and/or brazing and/or friction welding. In this way a simple and inexpensive assembling can be achieved.

Further advantages arise from the following description of the drawings. Exemplary embodiments of the invention are depicted in the drawings. The drawings, the description, and the claims contain numerous features in combination. The person skilled in the art will also advantageously consider the features individually and combine them into further meaningful combinations.

DETAILED DESCRIPTION

Figure 1:
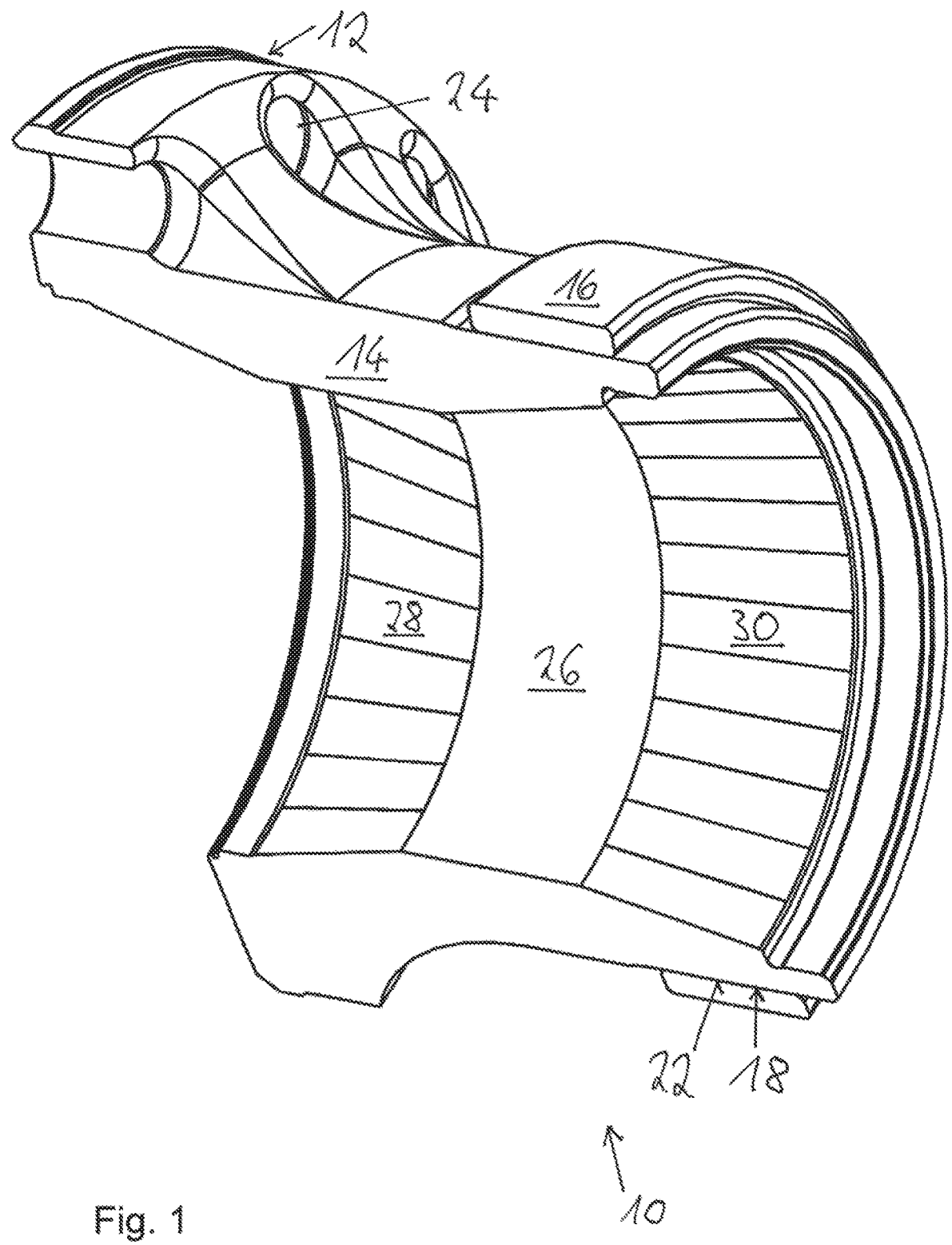
FIG. 1 is a section through a wheel hub according to the present disclosure.

FIG. 1 shows a section through a wheel hub 10 according to an embodiment of the disclosure, which includes a first axial end region 12 and a second axial end region 18 that lie opposite each other. The axial end region 12 is configured for attaching a wheel adapter. For this purpose the end region 12 is configured as a flange including through-holes 24, on which flange the wheel adapter is mountable by bolts. Furthermore, the wheel hub 10 includes a hub base body 14 configured one-piece, which hub base body 14 is configured to surround a part of a rolling-element bearing, more precisely a first tapered roller bearing, and a second tapered roller bearing (not illustrated). In a completely finally mounted state, a through-hole 26 of the wheel hub forms a corresponding receiving region for the two tapered roller bearings. The hub base body is an outer ring both for the first tapered roller bearing and for the second tapered roller bearing. Consequently the hub base body 14 includes a first raceway 28 for the first tapered roller bearing and a second raceway 30 for the second tapered roller bearing. Furthermore, the wheel hub 10 includes a component in the form of an annular body 16 that surrounds the hub base body and that is disposed at the second axial end region 18 of the wheel hub. The annular body differs from a flange and has a shape of a hollow circular cylinder except for machined edges, and is thus also a hollow cylinder. Consequently the hub base body 14 is also configured cylindrical-surface-shaped in a surface region 22 where the hub base body abuts against the annular body 16. Before attaching the annular body 16 to the hub base body 14, the surface region 22 is produced by turning or other machining.

The annular body 16 is configured one-piece. Furthermore, it is attached to the hub base body 14 by a press-fit. The press-fit has a significant overlap. In the event of a mounting the component is thus either simply immediately pressed onto the hub base body 14, or shrunk-on, i.e., first heated and then pressed onto the hub base body. Attaching the component to the hub base body 14 by friction welding or brazing is alternatively also conceivable. If the attachment is produced by brazing, then a gap is first provided between the annular body 16 and the hub base body 14 at the surface region 22; the gap serves for receiving solder by the capillary effect.

The annular body 16 is comprised of structural steel. In principle a wide variety of materials can be used to form the annular body 16, up to heat-treated high-strength steels. Other metals and composite materials can also be used as material for the annular body 16.

In its finally mounted form the annular body 16 has a dimensionally stabilizing effect for the wheel hub that prevents plastic deformations.

In one alternative exemplary embodiment, in a completely assembled state a wheel instead of a wheel adapter is mounted at the end region 12.

In alternative exemplary embodiments each of the tapered roller bearings can also be replaced by a different rolling-element bearing, such as in particular an angular contact ball bearing.

In particular in truck wheel bearing units under high lateral accelerations (e.g., with a sharp road curve), the disclosed wheel hub prevents excessively high radial raceway deformations. In particular on the inboard side of the wheel bearing, where conventional hubs are embodied in a very material-optimized manner, the deformations are so extreme that the stresses occurring without the annular body 16, and even with some commercially available wheel hubs, depart from or exceed the elastic material range in the critical range and cause plastic and thus lasting deformations.

A significantly plastically deformed tapered roller bearing raceway leads to a significant disturbance of the bearing kinematics. The so-called apex-point condition, which states that for pure rolling (ideal state) in the tapered roller bearing, the extension straight lines of the outer-ring raceway, inner-ring raceway, and axis of rotation must intersect at one point, is violated. The result is that the rolling elements no longer cleanly roll, but also slide significantly. This sliding generates friction, temperature, and finally wear on the raceways.

In operation or on the test stand, without the component or with some conventional commercially available wheel hubs, the expected/calculated bearing service life is no longer achieved and/or the friction losses are unacceptably too high.

Figure 2:
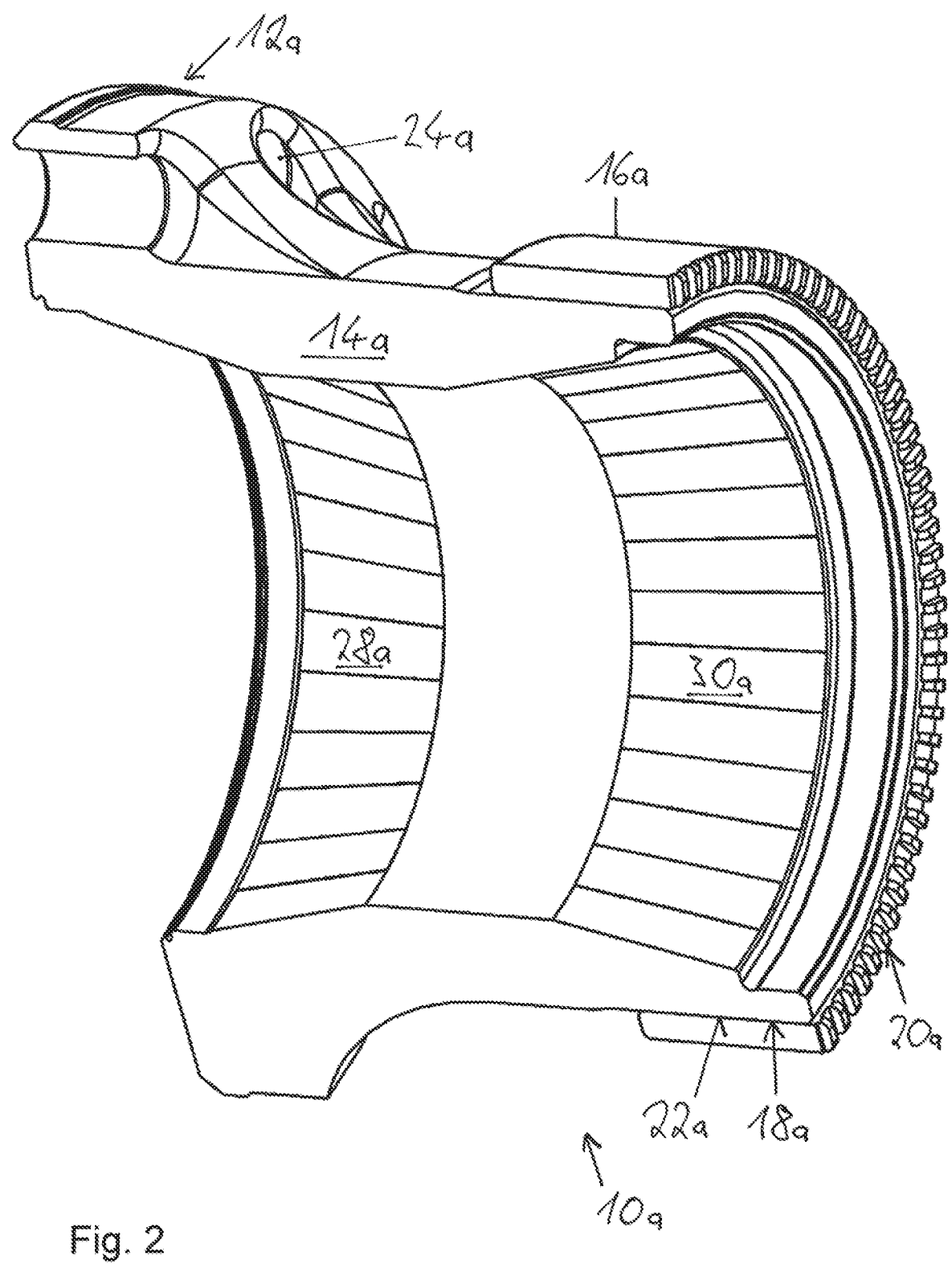
FIG. 2 is a section through an alternative exemplary embodiment of a wheel hub according to the present disclosure in which the wheel hub includes an antilock braking system (ABS) ring region.
Figure 3:
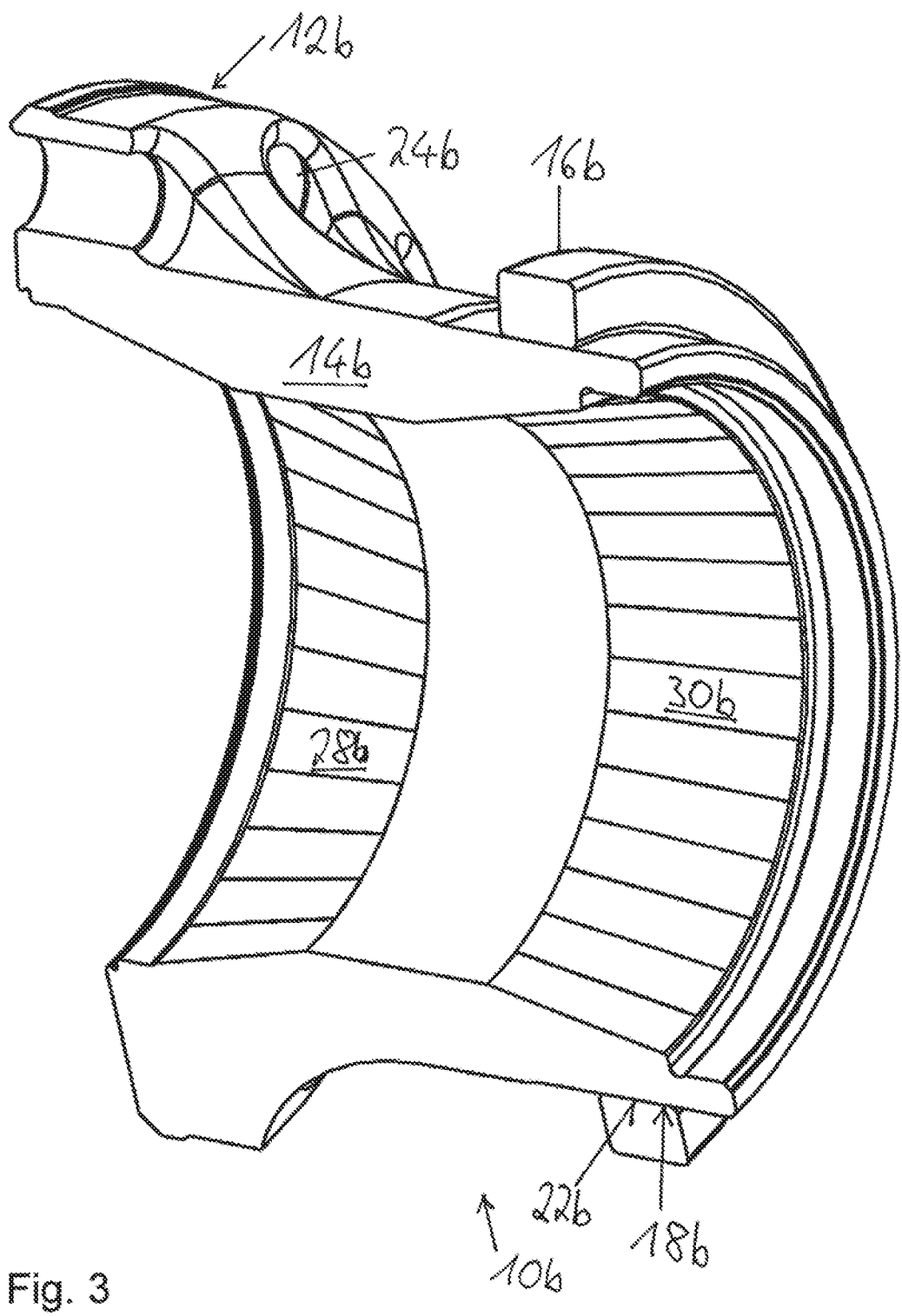
FIG. 3 is a section through a further alternative exemplary embodiment of a wheel hub according to the present disclosure, wherein a component of the wheel hub is substantially annular.
Figure 4:
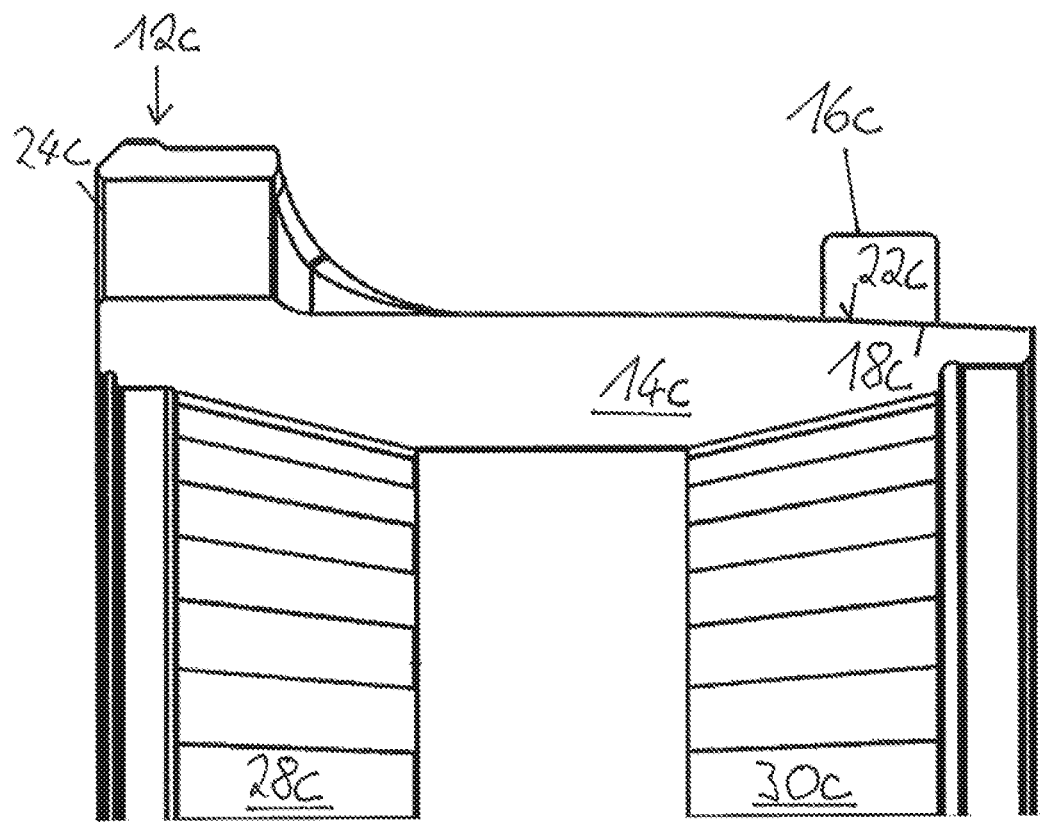
FIG. 4 is an axial section through a further alternative exemplary embodiment of a wheel hub according to the present disclosure wherein a hub base body includes a conical-surface-shaped surface.

Alternative exemplary embodiments are depicted in FIGS. 2 to 4. Essentially identical components, features, and functions are generally numbered with the same reference numbers. However, to differentiate the exemplary embodiments the letters "a," "b," etc. are added to the reference numbers of the exemplary embodiments in FIG. 2. to FIG. 4. The following description is essentially limited to differences from the exemplary embodiment in FIG. 1, wherein with respect to components, features, and functions remaining the same, reference can be made to the description of the exemplary embodiment in FIG. 1.

FIG. 2 shows an alternative exemplary embodiment of an inventive wheel hub, wherein an annular body 16a is disposed directly at an axial end of the wheel hub that includes an antilock braking system (ABS) ring region. The ABS ring region is provided by elevations that extend in the axial direction, which elevations are uniformly spaced from one another in the circumferential direction. In order for the ABS ring region to function, it is precisely positioned on the hub base body. The annular body 16a is also configured longer in this embodiment as compared to the annular body 16 of the first exemplary embodiment.

FIG. 3 shows a further alternative exemplary embodiment of a wheel hub according to the disclosure. An annular body 16b of the wheel hub is configured essentially annular, and specifically it is formed by a ring that has rounded edges.

FIG. 4 shows an upper half of an axial section through a wheel hub 10c according to another embodiment of the disclosure. An annular body 16c is attached by friction welding to a hub base body 14c of the wheel hub 10c. For carrying-out the required welding process, a surface region 20c of the hub base body 14c is configured conical-surface-shaped. Accordingly a radial inner surface of the component 16c is also configured conical-surface-shaped. During the attachment of the component 16c to the hub base body 14c the component 16c and the hub base body 14c are set in rotation relative to each other, and the component 16c is moved toward a center of mass of the hub base body 14c.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved wheel hubs.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Wheel hub
12 End region
14 Hub base body
16 Annular body
18 End region
20 ABS ring region
22 Surface region
24 Through-hole
26 Through-hole
28 Raceway
30 Raceway

The invention claimed is:

1. A wheel hub comprising:
a one-piece hub base body configured to surround at least a portion of a rolling-element bearing, the base body having a first axial end region configured to attach to a wheel adapter and/or to a wheel and a second axial end region axially opposite the first axial end region, and
an annular reinforcing band mounted on a radially outer surface of the second axial end region and connected to the radially outer surface at a joint,
wherein the base body without the reinforcing band is configured to plastically deform upon the application of an amount of force, and
wherein the reinforcing band is configured to prevent a plastic deformation of the base body upon the application of the amount of force.

2. The wheel hub according to claim 1, wherein the reinforcing band is not a wheel flange.

3. The wheel hub according to claim 1, wherein the reinforcing band includes a target for an antilock braking system (ABS).

4. The wheel hub according to claim 1, wherein the reinforcing band is an ABS ring.

5. The wheel hub according to claim 1, wherein the radially outer surface is cylindrical or conical.

6. The wheel hub according to claim 1, wherein the reinforcing band is attached to the hub base body by a press-fit or by brazing or by friction welding.

7. The wheel hub according to claim 1, wherein the reinforcing band is substantially cylindrical.

8. The wheel hub according to claim 1, wherein the reinforcing band is configured one-piece.

9. The wheel hub according to claim 1, wherein the reinforcing band comprises metal.

10. The wheel hub according to claim 1,
wherein the reinforcing band has a radially inner surface and a radially outer surface and has an axial width a radial thickness from the inner surface to the outer surface, and
wherein the axial width is greater than the radial thickness.

11. The wheel hub according to claim 9,
wherein the reinforcing band comprises metal and is configured one piece.

12. A wheel hub comprising:
a one-piece hub base body configured to surround at least a portion of a rolling-element bearing, the base body having a first axial end region configured to attach to a wheel adapter and/or to a wheel and a second axial end region axially opposite the first axial end region, and
an annular reinforcing band mounted on a radially outer surface of the second axial end region and being connected to the radially outer surface at a joint,
wherein the reinforcing band has a radially inner surface and a radially outer surface and has an axial width a radial thickness from the inner surface to the outer surface,
wherein the axial width is greater than the radial thickness, and
wherein the reinforcing band has an axially outer surface having teeth configured to form a target of an ABS.

* * * * *